(12) United States Patent
Rowell et al.

(10) Patent No.: US 12,518,346 B2
(45) Date of Patent: Jan. 6, 2026

(54) METHOD AND SYSTEM FOR PROCESSING MEASUREMENT DATA

(71) Applicant: Rohde & Schwarz GmbH & Co. KG, Munich (DE)

(72) Inventors: Corbett Rowell, Munich (DE); Otmar Wanierke, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 531 days.

(21) Appl. No.: 18/049,361

(22) Filed: Oct. 25, 2022

(65) Prior Publication Data

US 2023/0186443 A1 Jun. 15, 2023

(30) Foreign Application Priority Data

Dec. 10, 2021 (EP) .................................... 21213765

(51) Int. Cl.
*G06T 5/40* (2006.01)
*G06T 7/90* (2017.01)

(52) U.S. Cl.
CPC . *G06T 5/40* (2013.01); *G06T 7/90* (2017.01)

(58) Field of Classification Search
CPC .. G06T 5/40; G06T 7/90; G01R 13/02; G01R 23/16
See application file for complete search history.

(56) References Cited

U.S. PATENT DOCUMENTS

| 2014/0358477 | A1 | 12/2014 | Keller et al. |
| 2015/0294046 | A1 | 10/2015 | Rawlins |
| 2018/0246152 | A1 | 8/2018 | Bartels |
| 2021/0034918 | A1 | 2/2021 | Schaefer et al. |

FOREIGN PATENT DOCUMENTS

| CN | 109765425 A | 5/2019 | |
| CN | 113269675 A | 8/2021 | |
| WO | WO-2017121634 A1 * | 7/2017 | ............. G01R 23/16 |

* cited by examiner

*Primary Examiner* — Christopher E Mahoney
(74) *Attorney, Agent, or Firm* — CHRISTENSEN O'CONNOR JOHNSON KINDNESS PLLC

(57) ABSTRACT

The present disclosure concerns a method of processing measurement data. The method includes gathering measurement data by a measurement component, processing the measurement data by the measurement component, thereby producing at least one two-dimensional histogram of a measurement quantity depending on a variable for at least one period of time, forwarding, by the measurement component, the at least one two-dimensional histogram to a processing component, and processing, by the processing component, the at least one two-dimensional histogram received from the measurement component, thereby generating data associated with at least one histogram and data associated with a waterfall diagram having several waterfall lines, wherein each of the several waterfall lines is associated with an individual histogram. Further, the present disclosure concerns a system for processing measurement data.

18 Claims, 2 Drawing Sheets

METHOD AND SYSTEM FOR PROCESSING MEASUREMENT DATA

FILED OF THE DISCLOSURE

Embodiments of the present disclosure relate to a method of processing measurement data. Further, embodiments of the present disclosure relate to a system for processing measurement data.

BACKGROUND

In the state of the art, several application scenarios are known that require analysis and visualization of measurement data gathered, wherein the measurement data relates to time-varying data, for instance a time-dependent voltage, a frequency-dependent field strength and so on.

The different application scenarios inter alia comprise identification of interference sources, real-time comparison between multiple antennas/receivers for time alignment and/or for base station position estimation, e.g., direction finding in general.

In the state of the art, techniques are known to process and display the time-varying data, which include providing a waterfall diagram. In persistent waterfall diagrams, measurement data of previous measurements is displayed in lighter colors, wherein the measurement data is superimposed as layers behind current measurement data in order to show the respective history of the overall measurement data.

Further, the techniques known in the state of the art also comprise max-hold detection, wherein maximum values and/or minimum values are displayed while showing the current measurements. However, no history of the measurement data is provided by the max-hold detection technique. Accordingly, the max-hold detection technique has disadvantages compared to persistent waterfall diagrams, as no historic information about the measurements is provided.

However, a problem associated with those waterfall diagrams is that each measurement trace is superimposed on top of each other, which makes it inter alia difficult to perform interference detection and/or to compare two separate waterfalls with each other, e.g., in case of investigating multiple antennas.

Accordingly, there is a need for an improved possibility to investigate multiple antennas, for example to identify interference in an easier manner while also ensuring real-time comparison between multiple antennas/receivers for time alignment and/or for base-station position estimation.

SUMMARY

Embodiments of the present disclosure provide a method of processing measurement data. In an embodiment, the method comprises the steps of: gathering measurement data by a measurement component; processing the measurement data by the measurement component, thereby producing at least one two-dimensional histogram of a measurement quantity depending on a variable for at least one period of time; forwarding, by the measurement component, the at least one two-dimensional histogram to a processing component; and processing, by the processing component, the at least one two-dimensional histogram received from the measurement component, thereby generating data associated with at least one histogram and data associated with a waterfall diagram having several waterfall lines, wherein each of those several waterfall lines is associated with an individual histogram.

Further, embodiments of the present disclosure provide a system for processing measurement data. In an embodiment, the system comprises a measurement component having an output data interface and a processing component having an input data interface. The measurement component is connected with the processing component via the respective data interfaces. The measurement component is configured to gather measurement data and to process the measurement data, thereby producing at least one two-dimensional histogram of a measurement quantity depending on a variable for at least one period of time. The measurement component is configured to forward the at least one two-dimensional histogram to the processing component. The processing component is configured to process the at least one two-dimensional histogram received from the measurement component, thereby generating data associated with at least one histogram and data associated with a waterfall diagram having several waterfall lines, wherein each of the several waterfall lines is associated with an individual histogram.

The main idea is that the drawbacks of the techniques known in the state of the art are overcome by using a combination of a persistent waterfall diagram with a time storage and, for example, simultaneously providing the measurement data of past measurements as time-variant histograms. Accordingly, information concerning the past, e.g., historical data, is derivable from the histogram provided by the processing component. Accordingly, more information compared to a typical max-hold detection technique can be obtained. The respective waterfall diagram comprises persistent traces since the waterfall lines are associated with the individual histograms. Thus, the respective waterfall diagram is different to a classical waterfall diagram that is typically based on the measurement quantity itself rather than histogram(s).

Hence, the present disclosure relates to providing a distribution of the measurement quantity depending on a respective variable on which the measurement quantity depends during the at least one period of time. The measurement component feeds the processing component with the at least one two-dimensional histogram, which processes the at least one two-dimensional histogram in order to produce the respective data used for generating the waterfall diagram, namely a visual representation of the data by a waterfall diagram, as well as for generating the histogram of the processing component.

In some embodiments, the histogram of the processing component comprises more historical information than the respective two-dimensional histogram submitted which is associated with the respective period of time, as the histogram of the processing component stores the measurement data associated with several two-dimensional histograms submitted previously, namely the ones of several periods of time.

Generally, the measurement quantity may relate to a physical variable such as a level, a field strength, a voltage, etc. The measurement quantity is measured over a certain variable, e.g., a time within a time period, a frequency, a location or similar, during an observation period that may comprise several periods of time associated with a respective two-dimensional histogram provided by the measurement component when processing the respective measurement data. In other words, the entire observation period may be discretized or segmented in several time segments, namely several periods of time. In other words, several two-dimensional histograms may be gathered during the observation period by the measurement component.

Accordingly, the measurement component may produce several two-dimensional histograms for several periods of time, for example consecutive periods of time. In some embodiments, a respective two-dimensional histogram is provided for each period of time. The several periods of time together relate to the observation period, e.g., the entire measurement duration, namely the time spent for gathering the measurement data. Put differently, the entire measurement duration, namely the observation period, is segmented into several time segments that correspond to the respective periods of time, which are associated with a dedicated two-dimensional histogram, respectively.

Generally, examples of the methods and the systems allow for a real-time retrieval of information with optimized storage of historical data, for example when compared to max-hold techniques known in the state of the art. Accordingly, it is easier to identify interferences and to perform real-time comparison between multiple antennas/receivers for timing alignment and/or for base-station position estimation.

In some embodiments, the measurement component may perform several measurements of the measurement quantity with respect to the variable. The measurement component discretizes the measurement data obtained from the several measurements into time segments, namely periods of time, within the observation period. The respective two-dimensional histogram provided by the measurement component is associated with a specific period of time, wherein the two-dimensional histogram has a first scale for the size of the measurement quantity and a second scale for the size of the variable. Put differently, the scales form a two-dimensional grid, wherein each point on the first scale marks a row and each point on the second scale marks a column in the grid. For each grid point a counter is provided which is incremented with each measurement that falls on the respective grid point, e.g., the respective point on the first scale and the respective point on the second scale. The counters associated with the grid form a histogram for the respective time segment, namely the period of time. The counters are set to 0 at the beginning of the respective periods of time, e.g., time segments, after the measurement data associated with the (ending) period of time, e.g., the respective two-dimensional histogram, has passed to the processing component.

The respective two-dimensional histogram provided is processed by the processing component such that a histogram of the processing component as well as a waterfall diagram are generated. The histogram of the processing component is a two-dimensional polychrome histogram, wherein a ratio between the measured frequency of the measurement quantity in the respective counter and the total number of measurements of the measurement quantity in the corresponding second scale of the histogram is shown in a color-coded manner.

The waterfall diagram comprises colored pixels, wherein a row of the pixels in the waterfall diagram corresponds to the variable, e.g., the discrete second scale of the size of the variable. The color of the pixels may be determined based on the respective counters of the column of the histogram that is assigned to the specific waterfall line.

An aspect provides that the two-dimensional histogram provided by the measurement component is, for example, added to the histogram of the processing component and/or a defined number of individual histograms associated with the several waterfall lines of the waterfall diagram are subtracted, thereby obtaining a processed histogram after the period of time. Accordingly, the level of history, namely the information of the histogram outputted by the processing component, as well as the information provided by the waterfall diagram depend on each other, as information associated with the waterfall diagram, namely histograms associated with the several waterfall lines of the waterfall diagram, are subtracted such that they do not contribute to the processed histogram provided by the processing component.

Generally, the histogram of the measurement component may be added to the histogram of the processing component after each period of time.

Another aspect provides that the system comprises, for example, a user interface, via which the length of the at least one period of time can be set and/or parameters of the waterfall diagram can be adjusted, adapted, etc. The user is enabled to interact with the system by the user interface in order to adjust, adapt, etc., settings applied to the method of processing the measurement data, namely adjusting, adapting, etc., the period of time. Hence, the amount of measurement data associated with the two-dimensional histogram provided by the measurement component can be adapted.

Additionally or alternatively, parameters of the waterfall diagram may be adjusted, adapted, etc., namely parameters defining the respective visualization of the data associated with the waterfall diagram such as a color coding.

Further, it can be adjusted, adapted, etc., how much history of the overall measurement data should be displayed by the (processed) histogram of the processing component. As discussed above, the (processed) histogram of the processing component and the information provided by the waterfall diagram are mutually dependent on each other.

In some embodiments, the user interface and the processing component together may be configured to allow a selection of a waterfall line. Hence, a waterfall line may be selected. The waterfall line selected serves as a limiting line for the waterfall diagram and the histogram of the processing component, as the limiting line defines which individual histograms associated with waterfall lines are subtracted from the histogram of the processing component such that a processed histogram is obtained that is associated with a sum of all individual histograms of the waterfall lines up to the limiting line selected. The user interface may be associated with a dedicated control element for the setting or selection of the limiting line such that the user is enabled to change the respective selection of the limiting line.

For instance, the user may change the limiting line from L(u) to L(u2). If u2>u, all histograms that follow the lines u+1, u+2, . . . , u2 are added to the histogram of the processing component, thereby providing the processed histogram, whereas in case of u2<u all histograms assigned to the waterfall lines u2+1, u2+2, . . . , u are subtracted from the histogram, thereby providing the processed histogram.

Accordingly, the user can choose by the selectable, adjustable, adaptable, etc., limiting line, for example at any time, how much history should be provided by the (processed) histogram of the processing component, which therefore is a time-variant histogram.

In other words, the history of the measurement quantity shown in the representation of the histogram outputted by the processing component may be associated to a greater or lesser extent, which depends on the respective selection of the limiting line.

Another aspect provides that the histogram has, for example, at least two waterfall stages, also called histogram levels. The first waterfall stage is fed by the two-dimensional histogram received from the measurement component, whereas the second waterfall stage is fed from an accumulator associated with the previous waterfall stage, namely the first waterfall stage. In other words, the processing component comprises at least one accumulator that receives and accumulates the two-dimensional histogram(s) received from the measurement component in a defined manner.

Moreover, the accumulator in some embodiments may be assigned to a dedicated waterfall line of the waterfall diagram, whereas waterfall level lines associated with the respective waterfall stage or waterfall level are assigned to histograms as well such that each waterfall line of the waterfall diagram is associated with an individual histogram, either the one of the accumulator or one of the waterfall level lines.

In some embodiments, a decision maker is associated with the accumulator, which is configured to decide whether the content forwarded to the accumulator is accumulated by the accumulator or fed into a subsequent waterfall stage. The decision can be made, for example, by the number of additions already carried out by the accumulator or when exceeding a certain point in time, e.g., a defined point in time. The respective parameters of the decision maker can be changed during the operation of the system. Then, the observation period shown in the waterfall diagram also changes. The longer the decision maker enables the accumulator to accumulate content, the slower the respective information on the measurement quantity flows in the subsequent waterfall level or subsequent waterfall stage, as the information is accumulated in the accumulator of the previous waterfall stage.

In some embodiments, the histogram and/or the waterfall diagram may be processed by a trained machine learning model for image processing, which is trained such that characteristic regions are detected, for example regions being indicative of an interference, or for direction finding and/or for an antenna switching. In some embodiments, the time-varying histogram provided by the processing component is effectively a set of updating images, which ensures that the trained machine learning algorithm for image processing can be used to identify certain indicative characteristics in the images. This depends on the respective application and/or training of the machine learning algorithm.

Moreover, the histograms are stored in compressed form. Accordingly, the respective storage capacity required by the system can be lowered appropriately. Since an individual histogram is provided for each waterfall line, the compressed form has an impact on the overall required storage capacity.

Generally, each line in the time-variant histogram may relate to one frame containing data from digital IQ symbols.

Moreover, the system may comprise, for example, a display that is connected with the processing component. The processing component is configured to provide the data associated with the (processed) histogram and the data associated with the waterfall diagram such that the display is enabled to display (the respective representations of) the histogram and the waterfall diagram. In other words, the histogram as well as the waterfall diagram both are displayed so as to inform a user about the measurement(s) performed. The user may interact with the system, for example by the user interface, in order to make settings with regard to the display characteristics that have an influence on the visual representation of the waterfall diagram and/or the one of the histograms. For instance, the user may select a certain limiting line that decides how much history is provided in the (processed) histogram outputted by the processing component. Furthermore, the user may generally set the respective scaling of the waterfall diagram and/or the histogram while using the user interface.

In addition, the processing component may be configured to calculate the respective color of the displayed pixels of the waterfall lines according to at least one defined ruling. The calculation ensures that an intuitive waterfall diagram is provided that can be easily understood by the user.

In some embodiments, the color code of the respective pixels is determined by a ruling from the counters of the column of the histogram that is assigned to the waterfall line. For instance, the color results from the smallest or largest line number that has a counter value different from zero in the respective column of the associated histogram. Alternatively, the color results from a certain line number in the histogram, wherein a specified percentage of the measured values of the measurement quantity in a corresponding column in the associated histogram are below or above the certain line number. Alternatively, a mean value for a respective column of the associated histogram is calculated, wherein a color code is assigned to the mean value that is used for illustration purposes. In another alternative, a mean value for the respective column of the associated histogram is calculated in dependency of a function of the row, wherein the respective color code was assigned to the inverse function of the mean value.

A further aspect provides, for example, that the at least one defined ruling to be applied for calculating the color of the displayed pixels is adjustable, adaptable, etc., for example by a user interface. Hence, different rulings may be selected, for example by the user, that shall be applied in order to change the respective color of the displayed pixels. The ruling may be adapted or selected during the operation of the system, namely during the representation. Hence, it is not necessary that the respective ruling has to be defined at the beginning of the operation. In other words, the user is enabled to change the ruling for the representation of the waterfall diagram during the operation of the system and/or to select several rulings between which the user may change during the representation. Accordingly, different statistical properties of the measurement quantity with respect to the variable can be visualized over time within the entire observation period.

Generally, the (processed) histogram consists of colored pixels that are located in rows and columns, namely a grid. The respective color code of the pixels located in the grid is determined by a ruling that takes the counter value into account, which counts the frequency of the occurrence of an associated grid point in the measurement data, e.g., defined by the respective column and the respective row. For instance, the ratio between the measured frequencies of the measured quantity in the counter associated with the respective grid point and the total number of measurements of the measured quantity in the associated column is illustrated in a color-coded manner.

According to a further embodiment, the system may comprise several inputs via which different types of measurement data are gathered being processed by the measurement component and the processing component. In some embodiments, measurement data associated with multiple inputs may be gathered and/or processed simultaneously, e.g., radio frequency (RF) data, electrical data in general, audio data, temperature data or other data. The respective data may be gathered from multiple inputs, for instance antennas, cables or similar.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
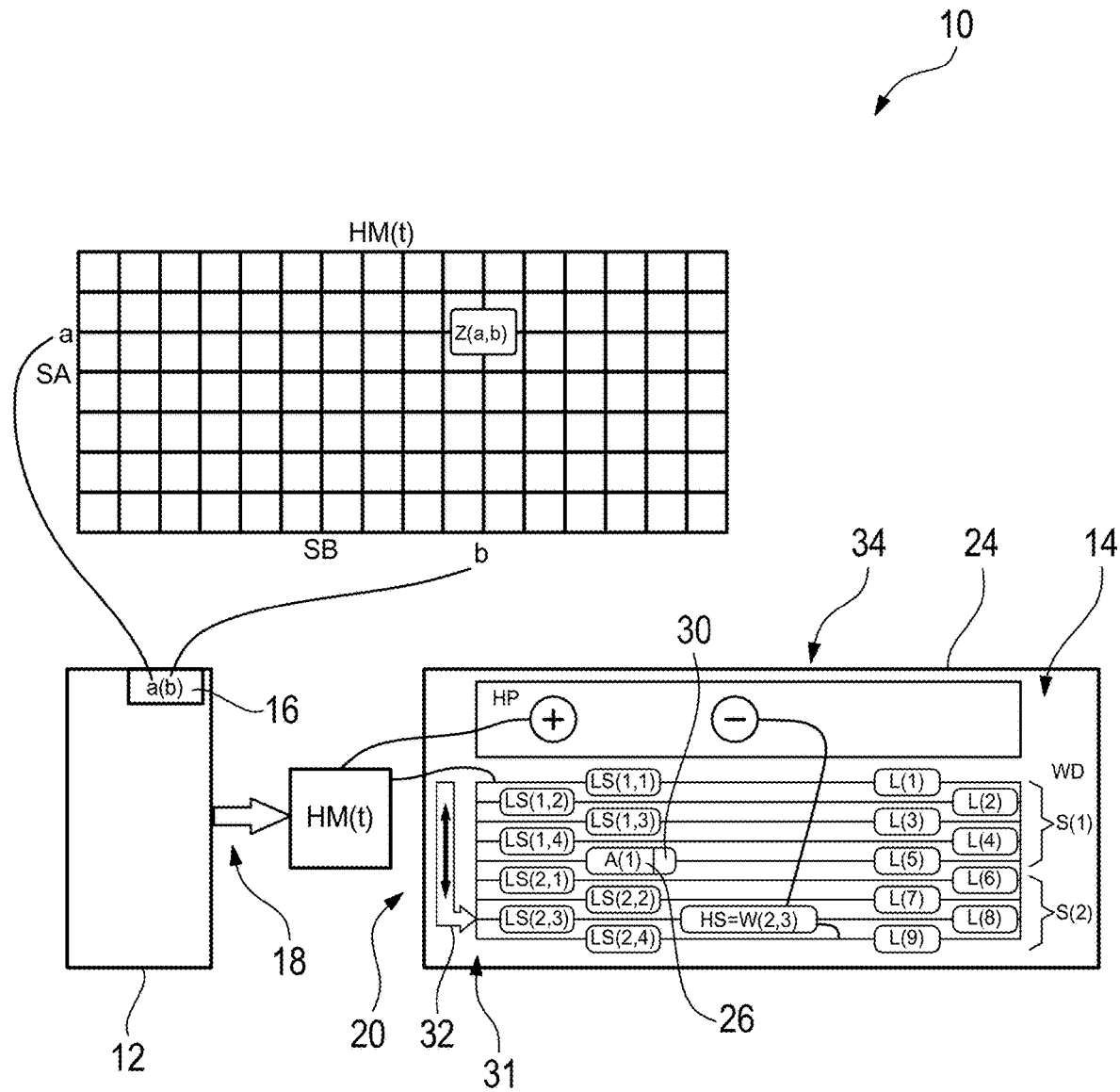
FIG. 1 schematically shows an overview of the system according to an embodiment of the present disclosure.

FIG. 1 depicts one example of a system 10 for processing measurement data. The system 10 may include a measurement component 12 as well as a processing component 14.

As shown in the example of FIG. 1, the measurement component 12 has at least one sensor interface 16 for gathering the measurement data. In addition, the measurement component 12 has an output data interface 18 via which the measurement component 12 is connected with the processing component 14, which has a respective input data interface 20.

As shown in FIG. 1, the measurement component 12 is generally configured to measure at least one measurement quantity that depends on a variable so that the measurement quantity is provided as a function of the respective variable. In the shown embodiment, the measurement quantity is indicated by "a", whereas the variable is indicated by "b" such that the function is denoted by "a(b)". For instance, the measurement quantity is associated with a physical variable, e.g., level, field strength, voltage, etc., which depends on the variable, for instance a time in a time period, a frequency or a location.

The measurement component 12 is generally configured to perform several measurements of the measurement quantity with respect to the variable during a certain observation period, mainly an overall measurement time. The respective measurement points obtained are discretised in time segments, namely periods of time, within the observation period on a scale SA associated with the measurement quantity as well as the scale SB for the variable on which the measurement quantity depends.

In FIG. 1, it is shown that the measurement component 12 is enabled to produce a histogram HM(t) for one period of time. The histogram HM(t) is associated with the first scale SA associated with the measurement quantity a, and the second scale SB associated with the variable b, thereby forming a two-dimensional grid. Each point on the scale SA marks a row, whereas each point on the scale SB marks a column in the respective grid.

Further, for each grid point, a counter Z(a, b) is provided, which is incremented with each measurement that falls on the respective grid point. The respective counters Z(a,b) arranged in the grid form the histogram HM(t) for the respective time segment, namely the period of time. The respective counters Z(a, b) of the histogram HM(t) are set to zero at the beginning of the period of time such that the counters Z(a, b) start counting.

Accordingly, the measurement component 12 is generally configured to gather measurement data by the measurement interface 16, wherein the measurement data is internally processed by the measurement component 12 such that the two-dimensional histogram HM(t) of the measurement quantity as a function of the variable for the period of time is produced.

In some embodiments, several two-dimensional histograms are produced by the measurement component 12 when taking measurement data associated with several periods of time into account, namely for the entire measurement duration.

Moreover, the measurement component 12 may comprise several inputs associated with several measurement interfaces 16 via which different types of measurement data are gathered that are processed by the measurement component 12 and the processing component 14 subsequently, as will be described later.

Alternatively, the system 10 comprises several measurement components 12, each having a single input, e.g., a single measurement interface 16. The several measurement components 12 may be connected with the processing component 14.

The at least one two-dimensional histogram HM(t), namely the one of the periods of time, is forwarded via the output data interface 18 of the measurement component 12 to the input data interface 20 of the processing component 14 such that the two-dimensional histogram HM(t) is received from the measurement component 12 for further processing.

In case of several two-dimensional histograms HM(t) produced by the measurement component 12, these several two-dimensional histograms HM(t) are forwarded to the processing component 14, for example in a subsequent manner.

The processing component 14 is generally configured to process the two-dimensional histogram(s) HM(t) received from the measurement component 12 in order to generate data associated with a histogram HP provided by the processing component 14 and data associated with a waterfall diagram WD provided by the processing component 14.

The respective diagrams, for example their representations, relate to an output 22 of the processing component 14, which may be visualized on a display 24 of the system 10.

The waterfall diagram WD has several waterfall lines L(j), wherein each of the several waterfall lines L(j) is associated with an individual histogram, namely a time-variant histogram.

Accordingly, the processing component 14 provides a persistent waterfall diagram that has the several waterfall lines associated with individual histograms.

Additionally, past measurements associated with the measurement data received and processed is also provided by the processing component 14 since the time-variant histograms are provided by the processing component 14 in addition to the waterfall diagram.

Figure 2:
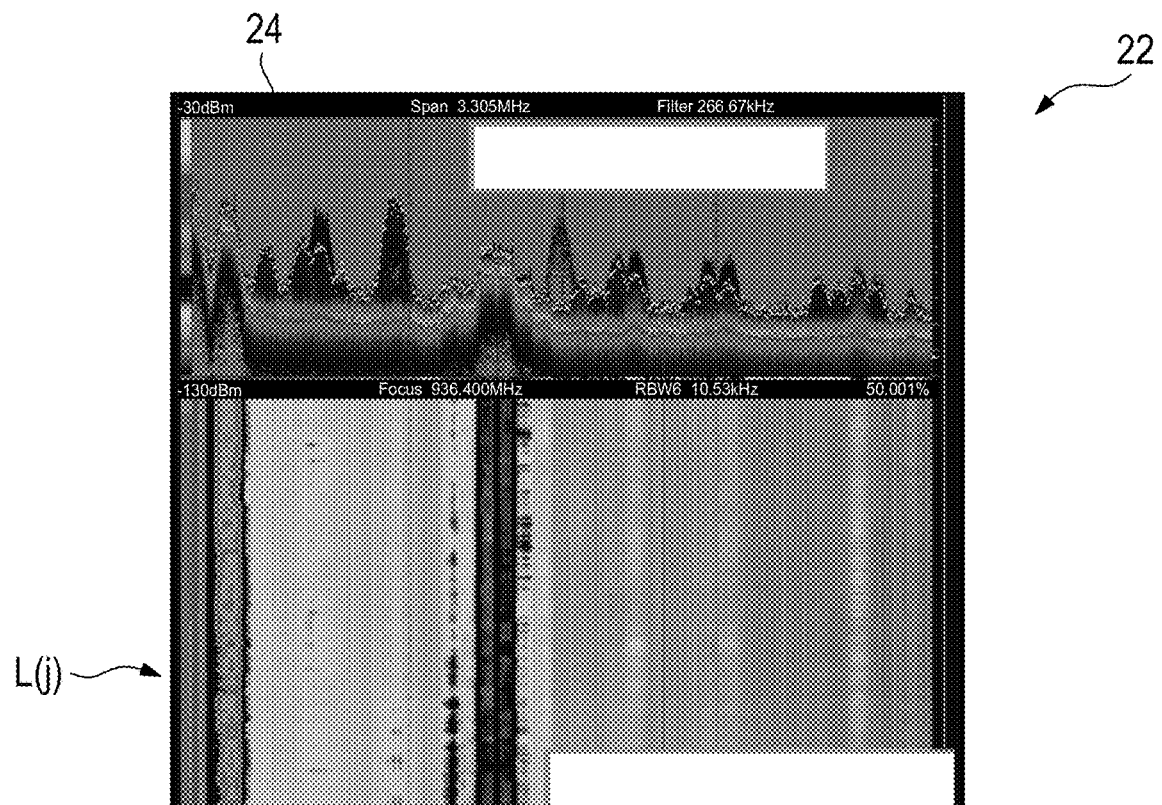
FIG. 2 shows an example of an image of the graphical output of the processing component of the system shown in FIG. 1.
Figure 3:
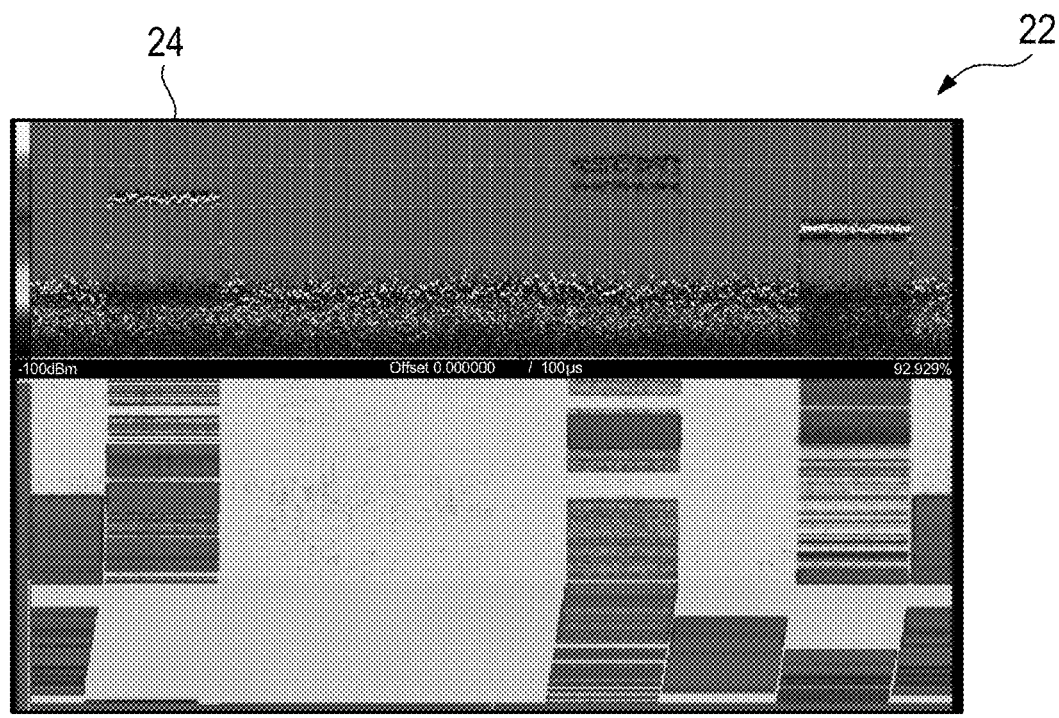
FIG. 3 shows another example of an image of the graphical output of the processing component of the system shown in FIG. 1.

The respective output 22 of the processing component 14, for example the visualizations provided by the display 24 connected with the processing component 14, is illustrated in FIG. 2 for an example and in FIG. 3 for another example. In other words, the processing component 14 outputs a representation of a histogram as well as a representation of a waterfall, which are illustrated by the display 24.

As mentioned above, the respective waterfall diagram WD provided consists of waterfall lines L(j) that are assigned to one or more waterfall levels S(k). A single waterfall level S(k) comprises i=1 . . . n(k) waterfall level lines LS(k, i) that are followed by an accumulator A(k) 26.

In FIG. 1, this is shown for the first waterfall level S(k=1), as this waterfall level, namely the first one, consists of i=1 . . . n(k=1)=4 waterfall level lines LS(1, i) which are followed by the accumulator A(k=1) 26. Hence, the first waterfall level S(k=1) comprises the waterfall level lines LS(1,1), LS(1,2), LS(1,3), LS(1,4) and the accumulator A(1) 26. In case, n(k) equals zero, the respective waterfall level would only consist of the accumulator 26, e.g., without any preceding waterfall level lines.

Generally, each of the waterfall level lines LS(k, i) of step k is assigned to a histogram W(k, i), wherein each accumulator 26 is associated with a histogram HA(k). Accordingly, a respective histogram, namely either W(k, i) or histogram HA(k), is assigned to each waterfall line L(j) of the respective waterfall level S(k).

This is also shown in FIG. 1, as S(k=1) has in total 5 waterfall lines L(j) with j=1 . . . 5, wherein L(j=1) to L(j=4) are associated with the histograms W(k=1, i) with i=1 . . . n(k)=4, namely the histograms associated with the waterfall level lines LS(k=1, i) with i=1 . . . n(k=1)=4. Further, waterfall line L(j=5) is assigned to the histogram HA(k=1) of the respective accumulator A(k=1) 26.

Accordingly, the first waterfall stage, namely the first waterfall level S(k=1), is fed by the histogram(s) HM(t) from the measurement component 12 directly, whereas the further stages S(k) with k>1 are fed by histograms from the accumulators A(k−1) 26 of the respective previous stages.

The accumulator 26 of the last waterfall level can be omitted, which is shown in FIG. 1 since the system 10 has only a single accumulator 26.

In some embodiments, the state of the waterfall level S(k) changes whenever a histogram H is fed into the respective level S(k).

The accumulator A(k) 26 is generally associated with a decision maker 30 that is configured to decide if content of the accumulator A(k) 26 is fed into the next level S(k+1) or if the accumulator A(k) 26 takes over the respective histogram W(k, i=n(k)) such that the respective histogram is accumulated in the respective accumulator A(k) and not fed into the next stage, e.g., the next waterfall level S(k+1).

The respective decision of the decision maker 30 whether the respective content is fed into the next stage or accumulated can be made by the number of additions already carried out in the accumulator A(k) 26 or by exceeding a certain point in time.

The respective parameters of the decision maker 30 can be changed during the operation of the system 10, wherein the observation period, namely the entire measurement time, shown in the waterfall representation also changes.

Generally, the longer the decision maker 30 lets histogram(s) accumulate in the respective accumulator A(k) 26, the slower the information on the measured variable flows into the subsequent waterfall level S(k+1).

As shown in FIG. 1, the waterfall diagram has at least two waterfall stages, wherein the first waterfall stage S(k=1) is fed by the two-dimensional histogram(s) HM(t) received from the measurement component 12, whereas a second waterfall stage S(k=2) is fed from the accumulator H(k=1) associated with the previous waterfall stage S(k=1).

After each period of time, the respective two-dimensional histogram HM(t) received from the measurement component 12 is added to the histogram HP of the processing component 14.

In addition, a certain waterfall line L(u) of the several waterfall lines provided in the waterfall diagram can be selected, to which either HA(k) or W(k, i) is assigned. In some embodiments, this depends whether the selected waterfall line is the last one of the respective waterfall level S(k), which is associated with HA(k), namely the histogram of the accumulator A(k) 26.

For this purpose, the processing component 14, inter alia, comprises a user interface 31 via which the user can generally adapt certain settings that are used for preparing the data for visualization, e.g., the length of the at least one period of time, thereby defining the amount of measurement data associated with one two-dimensional histogram.

The user may also interact with the user interface 31 of the processing component 14 in order to select the respective waterfall line L(u), for example a respective control element 32.

Hence, the user is enabled to change the selection of the waterfall line L(u) that corresponds to a limiting line for the illustration of the data, namely the representations of the waterfall diagram WD and the histogram HP. For instance, when the user changes the selection of the line L(u) to L(u2) during the processing, the histogram HP displayed and the waterfall diagram WD displayed change.

Specifically, if u2>u, all individual histograms associated with the waterfall lines L(j) that follow the lines u+1, u+2, . . . u2 are assigned and added to the histogram HP provided by the processing component 14. If u2<u, all individual histograms assigned to the waterfall lines of u2+1, u2+2, . . . , u are subtracted from the histogram HP provided by the processing component 14.

Accordingly, the respective waterfall line L(u) that serves as limiting line is adjustable such that the user is enabled to choose at any time how much history should be displayed by the histogram HP provided by the processing component 14. Therefore, conventional max-hold detectors are superfluous, as the user can decide which period of time measured in the past should be displayed in its statistical frequency, namely the histogram thereof.

The histogram HP and/or the waterfall diagram WD may be processed by a trained machine learning model 34 for image processing. The machine learning model 34 may be trained such that characteristic regions are detected in the histogram HP and/or waterfall diagram WD. These characteristic regions may relate to regions being indicative of an interference, indicative for direction finding and/or indicative for an antenna switching during the respective measurement. As shown in FIG. 1, the trained machine learning model 34 is run by the processing component 14. Alternatively, a separately formed machine learning module may be provided on which the trained machine learning model 34 runs. In some embodiments, the trained machine learning model includes, for example, one or more neural networks, such a convolutional neutral networks (CNNs).

The processing component 14 is generally configured to calculate the respective color of displayed pixel of the waterfall lines according to at least one defined ruling such that the user is enabled to obtain information from the respective waterfall diagram, namely its visualization. The ruling may be adapted by the user interacting with the user interface 31. Hence, the respective ruling for the representation of the waterfall diagram WD can be adapted during the operation of the system 10. In some embodiments, the respective ruling may be changed on-the-fly so that the respective representation can be changed directly and live.

The histograms may be stored in a compressed form, thereby reducing the storage capacity required by the system 10.

Generally, the system 10 may comprise several inputs via which different types of measurement data are gathered, which are processed by the measurement component 12 and the processing component 14.

In some embodiments, various components of the system, such as the measurement component 12 and the processing component 14, utilize circuitry (e.g., one or more circuits) in order to implement any one or more of standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes, among other things, hardware circuit implementations (e.g., implementations in analog circuitry, implementations in digital circuitry, and the like, and combinations thereof). In an embodiment, circuitry includes, among other things, combinations of circuits and computer program products having software or firmware instructions stored on one or more computer readable memories that work together to cause a device to perform one or more protocols, methodologies or technologies described herein. In an embodiment, circuitry includes, among other things, circuits, such as, for example, microprocessors or portions of microprocessor, that require software, firmware, and the like for operation. In an embodiment, circuitry includes, among other things, one or more processors or portions thereof and accompanying software, firmware, hardware, and the like.

Therefore, the functionality described herein with regard to, for example, the measurement component 12 and the processing component 14, can be implemented by special purpose hardware-based computer systems or circuits, etc., combinations of special purpose hardware circuits and computer instructions, or computer instructions for execution on a processor circuit or the like. Each of these special purpose hardware-based computer systems or circuits, etc., combinations of special purpose hardware circuits and computer instructions, etc., form specifically configured circuits, machines, apparatus, devices, etc., capable of implemented the functionality described herein.

Throughout this specification, terms of art may be used. These terms are to take on their ordinary meaning in the art from which they come, unless specifically defined herein or the context of their use would clearly suggest otherwise.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of processing measurement data, wherein the method comprises the steps of:
    gathering measurement data by a measurement component,
    processing the measurement data by the measurement component, thereby producing at least one two-dimensional histogram of a measurement quantity depending on a variable for at least one period of time,
    forwarding, by the measurement component, the at least one two-dimensional histogram to a processing component, and
    processing, by the processing component, the at least one two-dimensional histogram received from the measurement component, thereby generating data associated with at least one histogram and data associated with a waterfall diagram having several waterfall lines, wherein each of the several waterfall lines is associated with an individual histogram, wherein the waterfall diagram has at least two waterfall stages, wherein the first waterfall stage is fed by the two-dimensional histogram received from the measurement component, whereas the second waterfall stage is fed from an accumulator associated with the previous histogram stage.

2. The method according to claim 1, wherein the two-dimensional histogram provided by the measurement component is added to the histogram of the processing component and/or a defined number of individual histograms associated with the several waterfall lines of the waterfall diagram are subtracted, thereby obtaining a processed histogram.

3. The method according to claim 1, wherein a waterfall line is selected that serves as a limiting line for the waterfall diagram and the histogram of the processing component, as the limiting line defines which individual histograms associated with waterfall lines are subtracted from the histogram of the processing component such that a processed histogram is obtained that is associated with the sum of all individual histograms of the waterfall lines up to the limiting line selected.

4. The method according to claim 1, wherein a decision maker is associated with the accumulator, which decides whether the content forwarded to the accumulator is accumulated by the accumulator or fed into a subsequent waterfall stage.

5. The method according to claim 1, wherein the histogram and/or the waterfall diagram are/is processed by a trained machine learning model for image processing, which is trained such that characteristic regions are detected for a direction finding and/or for an antenna switching.

6. The method according to claim 5, wherein the characteristic regions are indicative of an interference.

7. The method according to claim 1, wherein the histograms are stored in compressed form.

8. A system for processing measurement data, wherein the system comprises:
  a measurement component having an output data interface; and
  a processing component having an input data interface,
  wherein the measurement component is connected with the processing component via the respective data interfaces,
  wherein the measurement component is configured to gather measurement data and to process the measurement data, thereby producing at least one two-dimensional histogram of a measurement quantity depending on a variable for at least one period of time,
  wherein the measurement component is further configured to forward the at least one two-dimensional histogram to the processing component,
  wherein the processing component is configured to process the at least one two-dimensional histogram received from the measurement component, thereby generating data associated with at least one histogram and data associated with a waterfall diagram having several waterfall lines, wherein each of the several waterfall lines is associated with an individual histogram, and
  wherein the processing component is configured to calculate the respective color of displayed pixels of the waterfall lines according to at least one defined ruling.

9. The system according to claim 8, wherein the processing component is configured to add the two-dimensional histogram provided by the measurement component to the histogram of the processing component and/or to subtract a defined number of individual histograms associated with the several waterfall lines of the waterfall diagram, thereby obtaining a processed histogram.

10. The system according to claim 8, wherein the system comprises a user interface, via which the length of the at least one period of time can be set and/or parameters of the waterfall diagram can be adapted.

11. The system according to claim 10, wherein the user interface and the processing component together are configured to allow a selection of a waterfall line that serves as a limiting line for the waterfall diagram and the histogram of the processing component, as the limiting line defines which individual histograms associated with waterfall lines are subtracted from the histogram of the processing component such that a processed histogram is obtained that is associated with the sum of all individual histograms of the waterfall lines up to the limiting line selected.

12. The system according to claim 8, wherein the processing component comprises at least one accumulator that is assigned to a dedicated waterfall line of the waterfall diagram.

13. The system according to claim 8, wherein a decision maker is associated with the accumulator, which is configured to decide whether the content forwarded to the accumulator is accumulated by the accumulator or fed into a subsequent waterfall stage.

14. The system according to claim 8, wherein the system comprises a display that is connected with the processing component, wherein the processing component is configured to provide the data associated with the histogram and the data associated with the waterfall diagram such that the display is enabled to display the histogram and the waterfall diagram.

15. The system according to claim 8, wherein the at least one defined ruling to be applied for calculating the color of the displayed pixels is adaptable.

16. The system according to claim 15, wherein the at least one defined ruling to be applied for calculating the color of the displayed pixels is adaptable by a user interface.

17. The system according to claim 8, wherein the system comprises several inputs via which different types of measurement data are gathered being processed by the measurement component and the processing component.

18. A method of processing measurement data, wherein the method comprises the steps of:
  gathering measurement data by a measurement component,
  processing the measurement data by the measurement component, thereby producing at least one two-dimensional histogram of a measurement quantity depending on a variable for at least one period of time,
  forwarding, by the measurement component, the at least one two-dimensional histogram to a processing component,
  processing, by the processing component, the at least one two-dimensional histogram received from the measurement component, thereby generating data associated with at least one histogram and data associated with a waterfall diagram having several waterfall lines, wherein each of the several waterfall lines is associated with an individual histogram, and
  wherein a combination of a persistent waterfall diagram with a time storage is used together with simultaneously providing the measurement data of past measurements as time-variant histograms.

* * * * *